United States Patent
Dubay et al.

(10) Patent No.: US 11,498,602 B2
(45) Date of Patent: Nov. 15, 2022

(54) BEARING RETAINER AND STEERING COLUMN ASSEMBLY WITH THE BEARING RETAINER

(71) Applicant: Steering Solutions IP Holding Corporation, Saginaw, MI (US)

(72) Inventors: Robert W. Dubay, Saginaw, MI (US); Randy W. Jones, North Branch, MI (US); Matthew J. T. Vincent, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/204,315

(22) Filed: Mar. 17, 2021

(65) Prior Publication Data
US 2022/0297738 A1    Sep. 22, 2022

(51) Int. Cl.
   B62D 1/16    (2006.01)
(52) U.S. Cl.
   CPC .................................... B62D 1/16 (2013.01)
(58) Field of Classification Search
   CPC . B62D 1/16; B62D 1/18; B62D 1/184; B62D 1/185; F16C 25/083
   See application file for complete search history.

(56) References Cited

U.S. PATENT DOCUMENTS

| | | | | |
|---|---|---|---|---|
| 4,415,166 A * | 11/1983 | Beia | ....................... | F16J 15/441 277/925 |
| 4,758,101 A * | 7/1988 | Roof, Sr. | .............. | F16C 35/077 384/537 |
| 5,531,526 A * | 7/1996 | Labedan | ................ | F16C 35/077 384/536 |
| 5,704,642 A * | 1/1998 | Jurik | ......................... | B62D 1/16 280/779 |
| 5,749,786 A * | 5/1998 | Pattok | ...................... | B62D 1/16 464/106 |
| 6,179,473 B1 * | 1/2001 | Ponson | .................. | F16C 25/083 384/537 |
| 6,227,715 B1 * | 5/2001 | Erhardt | ................. | F16C 25/083 384/537 |
| 6,279,953 B1 * | 8/2001 | Cartwright | ............. | B62D 1/195 280/779 |

(Continued)

FOREIGN PATENT DOCUMENTS

| | | |
|---|---|---|
| DE | 3305419 A1 * | 8/1984 |
| DE | 3329179 A1 * | 12/1984 |

(Continued)

*Primary Examiner* — Paul N Dickson
*Assistant Examiner* — Kurtis Nielson
(74) *Attorney, Agent, or Firm* — Dickinson Wright PLLC

(57) ABSTRACT

A steering column assembly comprises an outer jacket extending along an axis and defining a central opening for placing a steering shaft and a bearing assembly. A bearing retainer is located in the outer jacket for axially retaining the bearing assembly in the outer jacket. The bearing retainer comprises a first surface spaced from a second surface by an outer edge and an inner edge. The inner edge defines an opening for placement of the steering shaft. The bearing retainer includes a first spring finger extending from the first surface away from the second surface at an angle and a second spring finger extending from the second surface away from the first surface at an angle.

16 Claims, 8 Drawing Sheets

(56) References Cited

U.S. PATENT DOCUMENTS

| | | | | |
|---|---|---|---|---|
| 6,378,834 B1 * | 4/2002 | Baker | ............... | F16F 15/08 |
| | | | | 248/674 |
| 6,874,384 B1 * | 4/2005 | Freiwald | ............... | F16B 9/052 |
| | | | | 403/279 |
| 2001/0014264 A1 * | 8/2001 | Wolfe | ............... | F16D 1/08 |
| | | | | 411/526 |
| 2014/0171209 A1 * | 6/2014 | Buzzard | ............... | B62D 1/16 |
| | | | | 464/167 |
| 2014/0345414 A1 * | 11/2014 | Erhardt | ............... | F16C 35/0635 |
| | | | | 384/538 |
| 2019/0054948 A1 * | 2/2019 | Angelin | ............... | B62D 1/185 |
| 2021/0285498 A1 * | 9/2021 | Sulser | ............... | F16C 25/083 |

FOREIGN PATENT DOCUMENTS

| | | | | | |
|---|---|---|---|---|---|
| DE | 19804328 | A1 * | 8/1999 | ............ | F16C 25/083 |
| DE | 102006019574 | A1 * | 11/2007 | ............ | B62D 1/16 |
| DE | 102015213021 | A1 * | 1/2017 | ............ | F16C 27/04 |
| DE | 102017119986 | A1 * | 2/2019 | | |
| EP | 1627795 | A2 * | 2/2006 | ............ | B62D 1/16 |
| JP | 11171026 | A * | 6/1999 | | |
| KR | 20090082652 | A * | 7/2009 | | |
| WO | WO-2019170433 | A1 * | 9/2019 | ............ | B62D 1/185 |

\* cited by examiner

BEARING RETAINER AND STEERING COLUMN ASSEMBLY WITH THE BEARING RETAINER

TECHNICAL FIELD

This disclosure relates to a bearing retainer and, in particular, to a bearing retainer for a steering column assembly and a steering column assembly with the bearing retainer.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle.

Steering columns typically include an outer jacket with a steering shaft located within the outer jacket that is operably connected on a first end to a steering input, such as a steering wheel, and an output on a second end, such as a pinion shaft assembly. When the steering wheel is turned, the steering shaft rotates within the outer jacket to interact with the steering linkage. Typically, the outer jacket is mounted to a component of the vehicle such that it cannot rotate and a bearing assembly permits the steering shaft to rotate relative to the jacket.

Some steering columns are axially adjustable between positions. In the past, a function of axially adjustable steering columns was to provide flexibility in the location of the hand wheel and facilitate more comfortable driving positions for different sizes of drivers. There axially adjustable steering columns typically include two or more outer jackets that move axially relative to one another but do not rotate. In such arrangements, the steering shaft rotates relative to each of the outer jackets and may require more than one bearing assembly.

There are a number of traditional bearing assembly configurations that typically include an inner race operably connected to the steering shaft and an outer race operably connected to the outer jacket that are separated by ball bearings. While these traditional bearing assemblies facilitate relative rotation between parts, they must be axially retained within the steering column such that they are not susceptible to misalignment or disassembly, which can be particularly challenging in steering columns that are axially adjustable. Traditional retaining systems include secondary mechanical fasteners or a tight press-fitting of the bearing assembly. While these traditional retaining systems serve to axially retain the bearing assembly, they are not without drawbacks. For example secondary mechanical fasteners require additional weight, fastener receiving apertures that can effect structural integrity, and complicated assembly processes. Similarly, bearing assemblies configured to be press-fit are subject to production variances and also require complicated assembly processes.

Accordingly, improvements in bearing retainer features continue to be of interest. Particularly, improvements on weight and simplicity of assembly.

SUMMARY

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

This disclosure relates generally to a bearing retainer for a bearing assembly of a steering column. The bearing retainer comprises a first surface spaced from a second surface by an outer edge and an inner edge. The inner edge at least partially defines an opening for placement of a provided steering shaft. The bearing retainer further includes at least one first spring finger extending from the first surface away from the second surface at an angle.

In accordance with another aspect, this disclosure relates to a steering column assembly comprising an outer jacket extending along an axis and defining an opening for placing a provided steering shaft and a provided bearing assembly. The steering column assembly further includes a bearing retainer for retaining the provided bearing assembly in the outer jacket. The bearing retainer comprises a first surface spaced from a second surface by an outer edge and an inner edge. The inner edge at least partially defines an opening for placement of the provided steering shaft. The bearing retainer further includes at least one first spring finger extending from the first surface away from the second surface at an angle.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
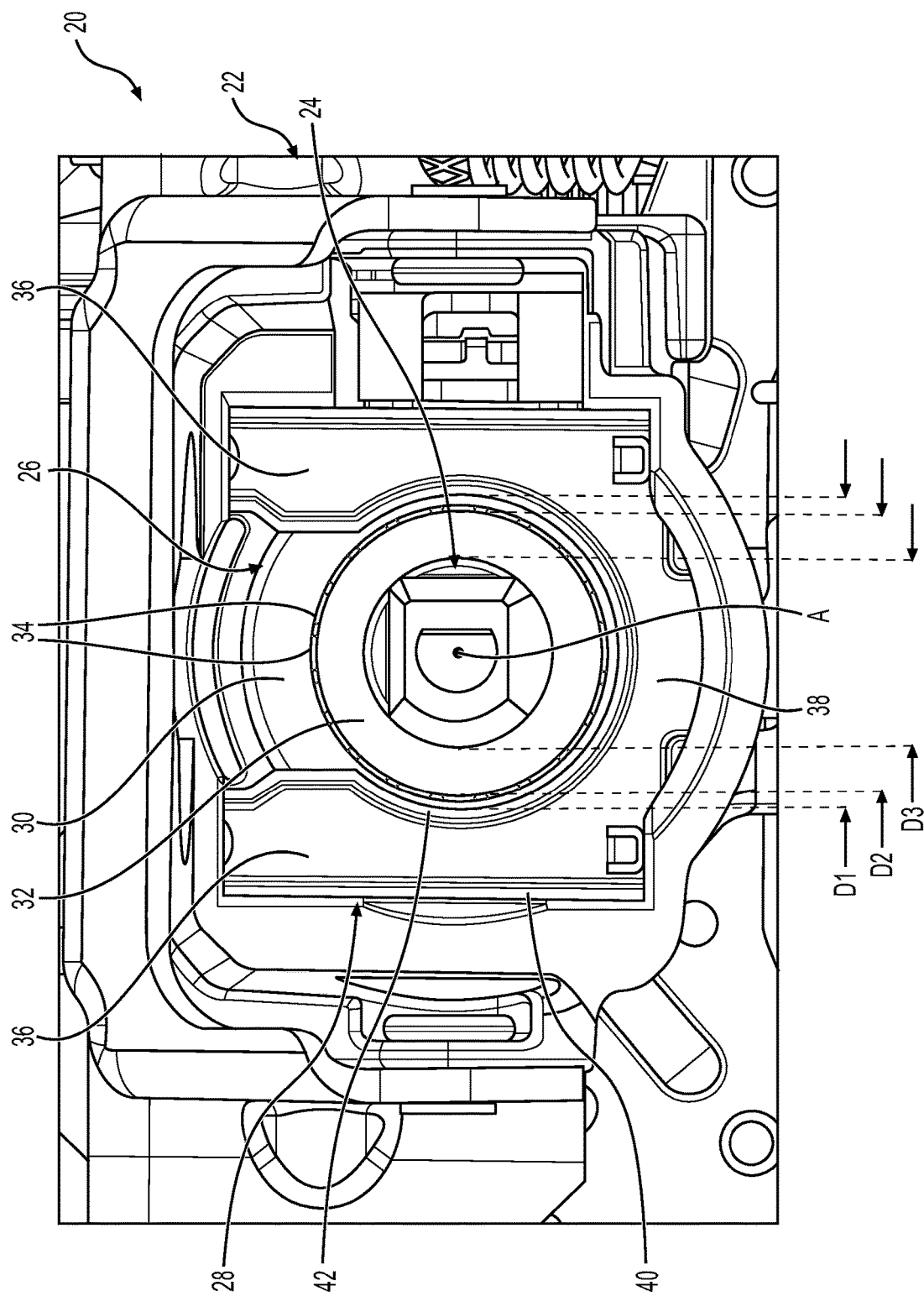
FIG. 1 generally illustrates an end view of a first embodiment of a steering column assembly having a bearing retainer according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, features of the subject disclosure may be incorporated into a vehicle, such as a car, truck, sport utility vehicle, crossover, mini-van, marine craft, aircraft, all-terrain vehicle, recreational vehicle, or other suitable vehicles, that include various steering system schemes, for example, steer-by-wire and driver interface steering. These steering system schemes may include a steering column assembly for translating steering input to an output that interacts with a steering linkage to ultimately cause the vehicle wheels (or other elements) to turn the vehicle. These steering systems may further include configurations that permit the steering column assembly to be axially adjusted or angularly (rake) adjusted.

Referring now to the drawings, where the various embodiments are shown and described herein, without limiting same, FIGS. 1-8 illustrate embodiments of a bearing retainer for a steering column assembly and a steering column assembly with the bearing retainer. The bearing retainer has a thinly shaped configuration to snap into the steering column assembly adjacent to a bearing assembly without requiring additional assembly steps.

Referring initially to FIG. 1, it generally illustrates an end view of a first embodiment of the disclosure. A steering column assembly 20 extends along an axis A and includes at least one outer jacket 22 and a steering shaft 24 located within the at least one outer jacket 22. The steering column assembly 20 further includes a bearing assembly 26 facilitating relative rotational movement between the at least one outer jacket 22 and the steering shaft 24. A bearing retainer 28 axially locates and retains the bearing assembly 26 in at least one direction along the axis A. The steering shaft 24 may be operably connected on a first end to a steering input (not shown), such as a steering wheel, and an output (not shown) on a second end, such as a pinion shaft assembly, an I-shaft, a cardan joint, steer-by-wire components, or other features.

The bearing assembly 26 may include an outer race 30 and an inner race 32 inside the outer race 30. A plurality of bearing elements 34 may be located between the outer race 30 and the inner race 32 and facilitate relative rotation therebetween. In some embodiments, the bearing elements 34 may have spherical-shapes. In some embodiments, the outer race 30 is statically connected to the at least one outer jacket 22 and the inner race 32 is statically connected to the steering shaft 24.

The bearing retainer 28 may define a U-shape, having a pair of arms 36 separated by a bottom portion 38. The pair of arms 36 may extend in a parallel relationship. Each of the arms 36 and the bottom portion 38 includes an outer edge 40 and an inner edge 42 generally located between the outer edge 40 and the axis A. In some embodiments, the inner edge 42 of the bottom portion 38 and arms 36 includes an arched portion 44 that at least partially defines an opening of a circular shape having a first diameter D1. In some embodiments, the inner race 32 defines a second diameter D2 and the steering shaft 24 defines a third diameter D3. In some embodiments, the first diameter D1 is larger than the second diameter D2, such that the inner race 32 and the steering shaft 24 are accessible and visible through the opening. In some embodiments, the first diameter D1 is larger than the third diameter D3 such that the steering shaft 24 is accessible and visible through the opening. As will be described in greater detail below, the at least one outer jacket 22 includes a series of pockets for locating portions of the arms 36 and the bottom portion 38.

Figure 2:
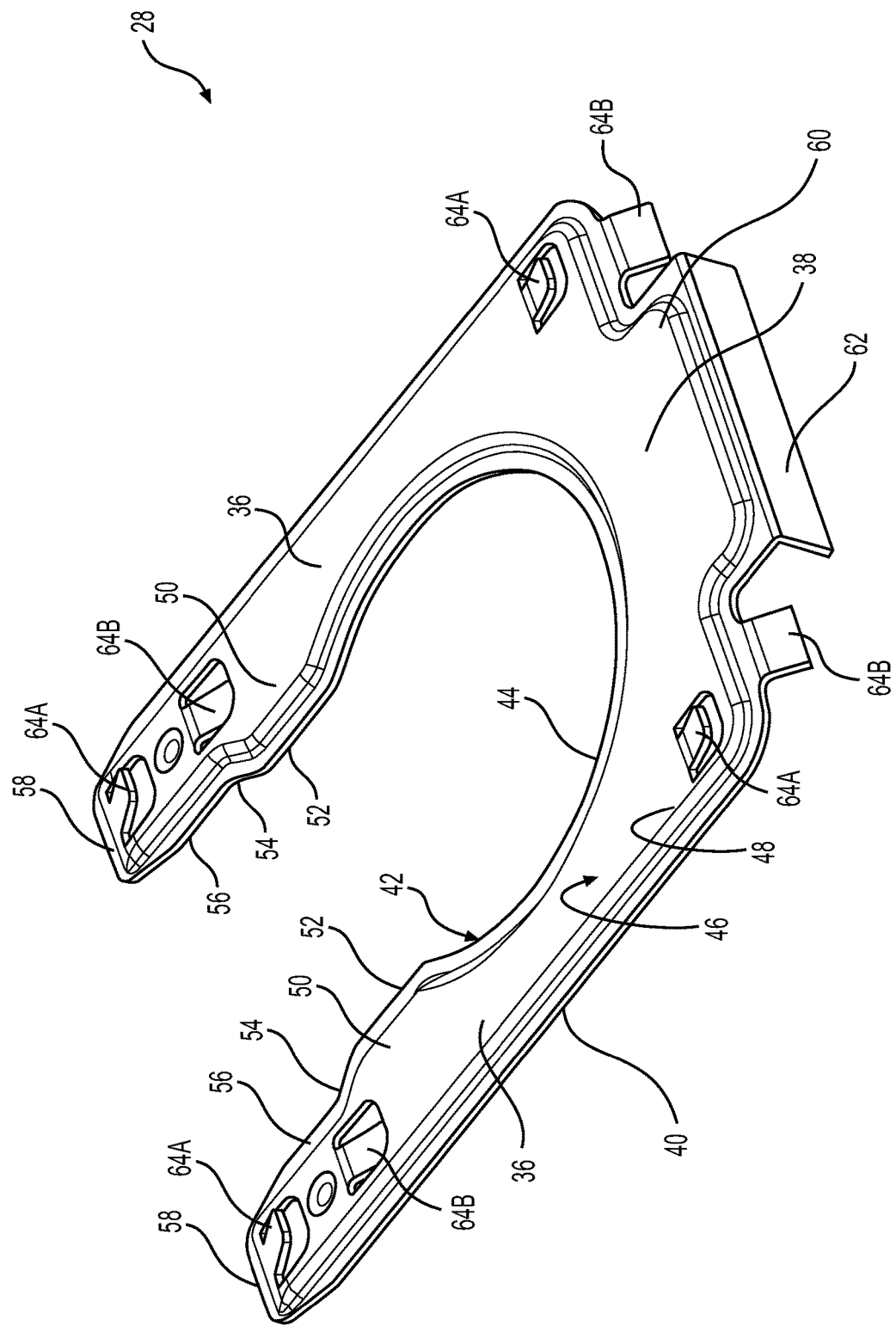
FIG. 2 generally illustrates a first surface of the bearing retainer.

FIG. 2 generally illustrates a first surface 46 of the bearing retainer 28. In some embodiments, the first surface 46 may face the bearing assembly 26. The first surface 46 includes a raised portion 48 located between the outer edge 40 and the inner edge 42. The raised portion 48 may generally include the same shape as the outer edge 40 and the inner edge 42. Each arm 36 may include a projection portion 50 that extends towards the other arm 36, the projection portions 50 may at least partially define the arched portion 44 and may further define first straight sections 52 along the inner edge 42 and taper portions 54 that taper away from each other. Second straight sections 56 may be defined by the inner edge 42 after the taper portions 54 opposite the first straight sections 52. The second straight sections 56 may extend to arm ends 58 that are located opposite the bottom portion 38. The outer edge 40 along each of the arms 36 may be generally straight from the arm ends 58 to the bottom portion 38. The outer edge 40 of the bottom portion 38 includes a retaining tab 60 projection centrally from the bottom portion 38. The retaining tab 60 may at least partially define the raised portion 48 on the first surface 46 and angled portion 62 projecting at an angle from the first surface 46. In some embodiments, the angled portion 62 may extend at a non-zero angle from the first surface 46, for example, between 60 and 120 degrees and/or approximately 90 degrees.

The bearing retainer 28 may include at least one spring finger 64A, 64B. In some embodiments, the at least one spring finger 64A, 64B includes a plurality of spring fingers 64A, 64B including at least one first spring finger 64A extending away from the first surface 48 opposite a second surface 66 (FIG. 3) and at least one second spring finger 64B extending away from the second surface 66 opposite the first surface 48.

Figure 3:
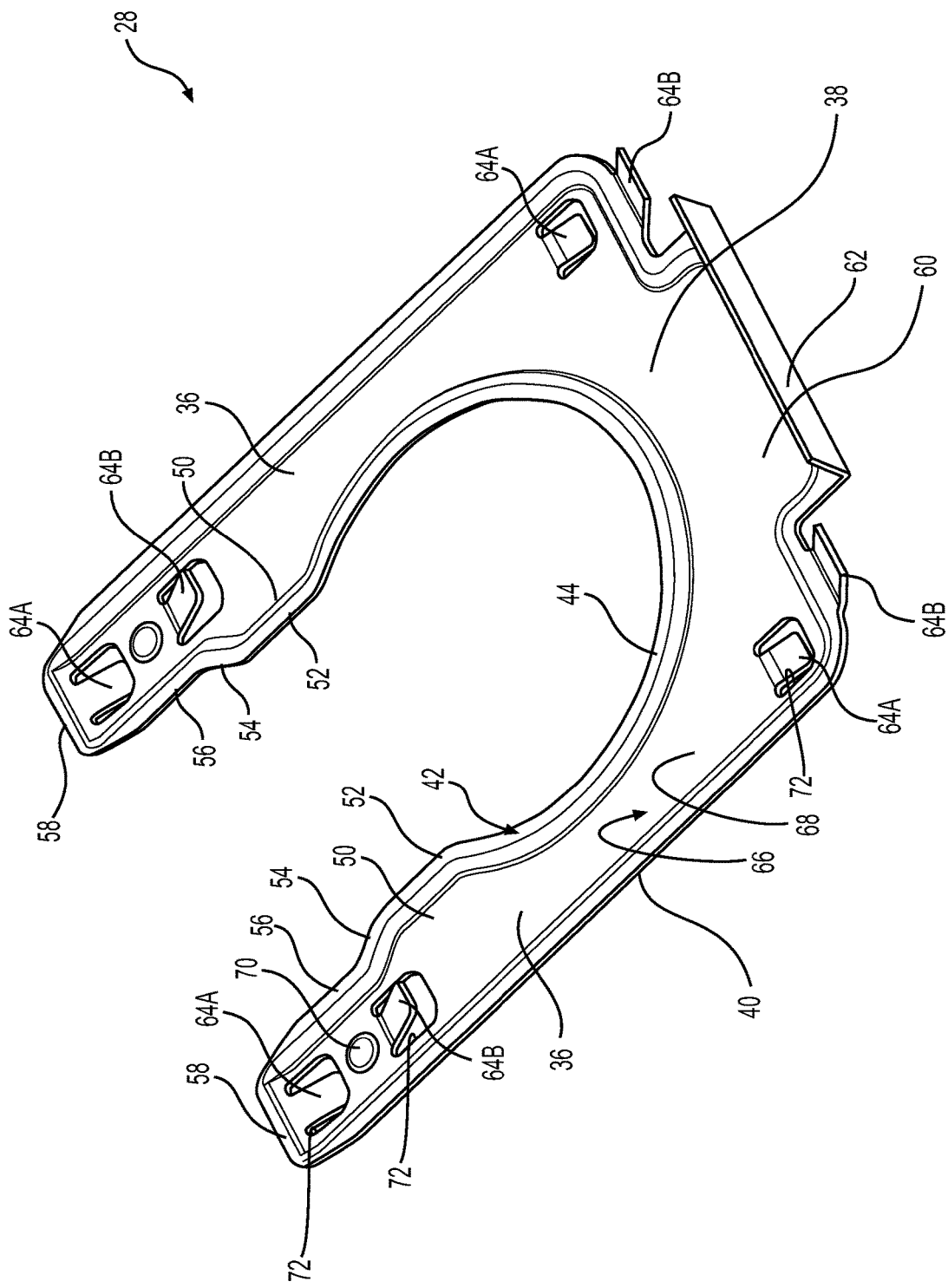
FIG. 3 generally illustrates a second surface of the bearing retainer.

FIG. 3 generally illustrates the second surface 66 of the bearing retainer 28. The second surface 66 includes a depressed portion 68 located between the outer edge 40 and the inner edge 42. The depressed portion 68 may generally include the same shape as the outer edge 40 and the inner edge 42 and may further correspond to the raised portion 48 on the first surface 48. In some embodiments, the bearing retainer 28 is formed of a single sheet of material (e.g., via stamping) such that a thickness defined between the first surface 46 and the second surface is constant. In some embodiments, each arm 36 includes a first spring finger 64A and a second spring finger 64B located near the arm end 58. For example, a first spring finger 64A adjacent to the arm end 58 and a second spring finger 64B located near the arm end 58 opposite the first spring finger 64A. A dimple 70 may be located between the spring fingers 64A, 64B near the arm end 58 to provide structural support.

In some embodiments, the bottom portion 58 may further define a spring finger 64A, 64B located adjacent to opposite ends of the retaining tabs 60. For example a first spring finger 64A located adjacent to opposite ends of the retaining tab 60. The bottom portion 58 may also define a spring finger 64A, 64B projecting from an outer edge 40 of the bottom portion 58 adjacent to opposite ends of the retaining tab 60. For example, a second spring finger 64B projects from an outer edge 40 of the bottom portion 58 adjacent to opposite ends of the retaining tab 60. As such, from a direction of the arm ends 58 towards the bottom portion 58, the spring fingers 64A, 64B may alternate between first spring fingers 64A and second spring fingers 64B. Other than the spring fingers 64A, 64B projecting from the outer edge 40 of the bottom portion 58 adjacent to opposite ends of the retaining tab 60, the other spring fingers 64A, 64B may be cut out from the bearing retainer 28 and located in spring finger apertures 72 between the inner edge 40 and the outer edge 42.

Figure 4:
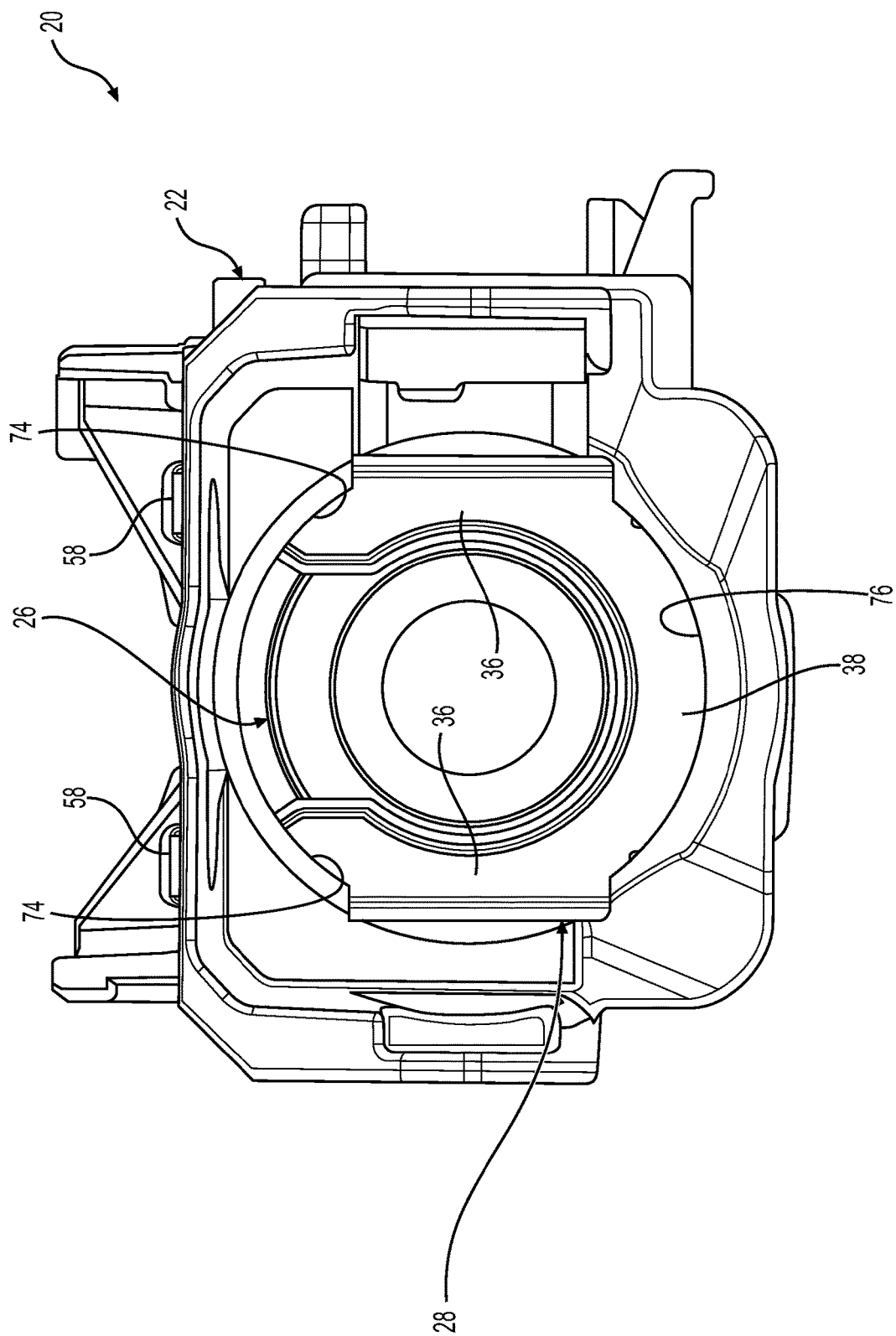
FIG. 4 generally illustrates an end view of an outer jacket of the steering column assembly and the bearing retainer isolated from additional components of the steering column assembly.

FIG. 4 generally illustrates an end view of the outer jacket 22 of the steering column assembly 20 and the bearing retainer 28 isolated from additional components of the steering column assembly 20. The outer jacket 22 includes a series of pockets for insertion of the bearing retainer 28. More particularly, the outer jacket 22 includes a pair of arm pockets 74 for locating the arms 36. The arm pockets 74 may extend entirely through an inner and outer surface of the outer jacket 22 such that the arm ends 58 are located on an exterior of the outer jacket 22. The outer jacket 22 may further include a bottom portion pocket 76 for locating at least a portion of the bottom portion 58 including the retaining tab 60.

Figure 5:
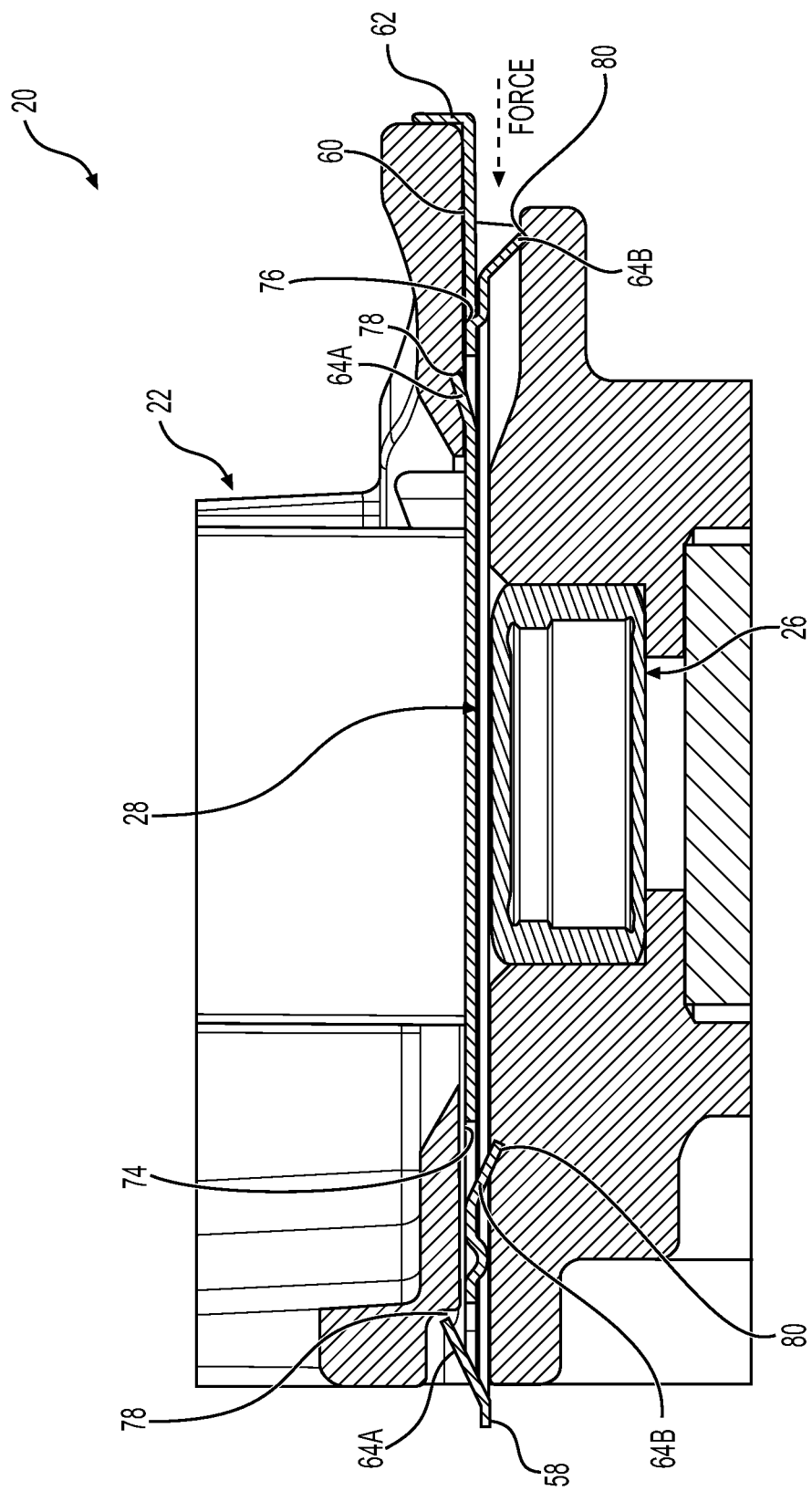
FIG. 5 generally illustrates a cross-sectional side view of the bearing retainer secured in a series of pockets of the outer jacket.

FIG. 5 generally illustrates a cross-sectional side view of the bearing retainer 28 secured the outer jacket 22. As illustrated, the first spring fingers 64A and second spring fingers 64B are attached in a same direction with respect to the arm ends 58 and bottom portion 38. More particularly, each spring finger 64A, 64B may extend from a location towards the arm ends 58 and extend at an outward angle in a direction away from the arm ends 58. As such, the bearing retainer 28 may be inserted into the outer jacket 22 as indicated with the arrow marked "force" and each spring finger 64A, 64B may compress towards one another and lock onto surfaces of the outer jacket 28 facing the same general direction. The outer edge 40 defining the arms 36 may be at a width less than the bottom portion pocket 76 to facilitate insertion.

Figure 6:
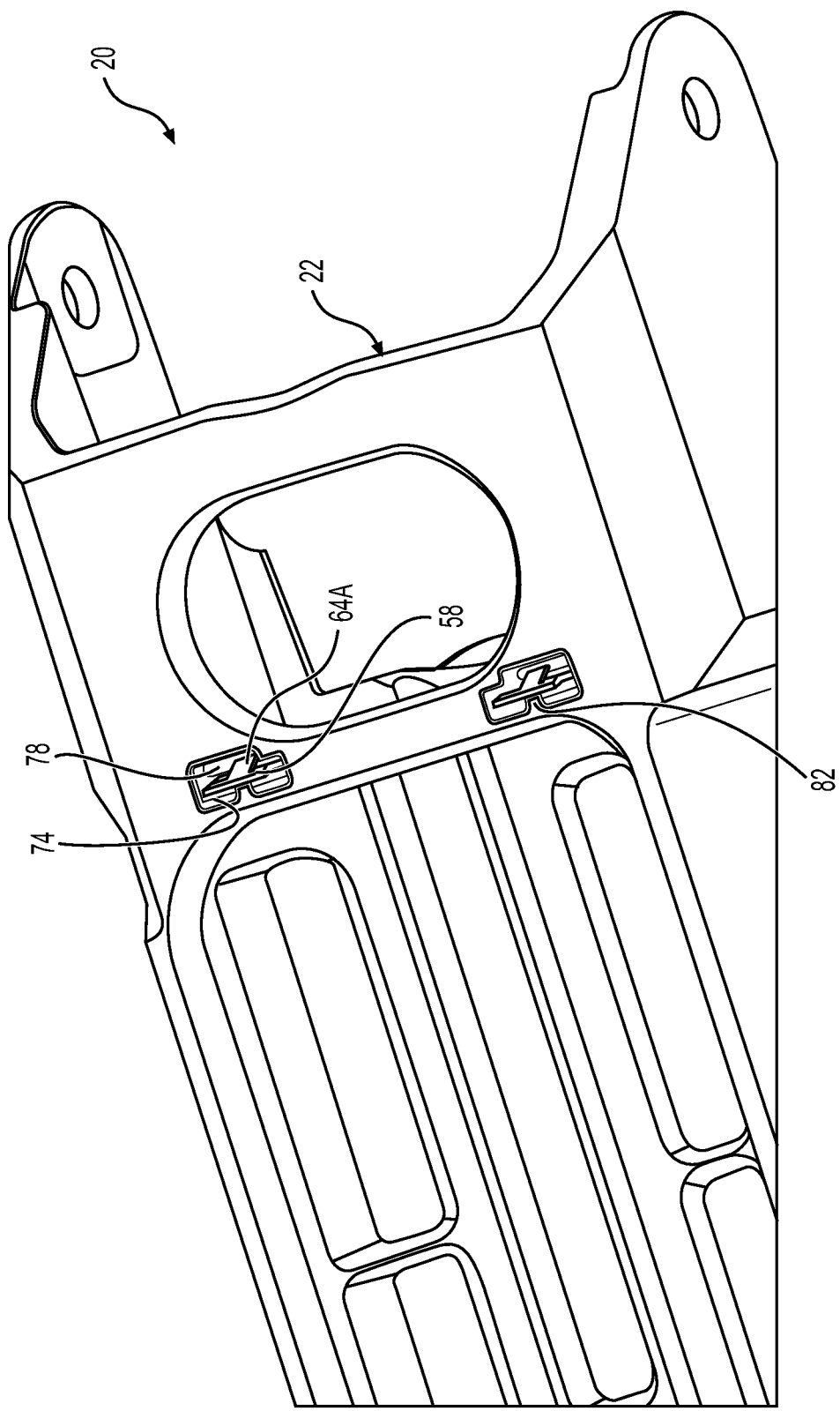
FIG. 6 generally illustrates a perspective view of the bearing retainer secured in the series of pockets of the outer jacket.

With continued reference to FIG. 5, the arm pockets 74 may be defined by a first spring finger retaining surface 78 and a second spring retaining surface 80. The bottom portion pocket 76 may also be defined by a first spring finger retaining surface 78 and a second spring retaining surface 80. The first spring finger retaining surfaces 78 and the second spring retaining surfaces 80 may extend outwardly from the arm pockets 74 and the bottom portion pocket 76 in opposite directions along the axis A. During assembly, the spring fingers 64A, 64B are compressed as the enter the bottom portion pocket 76 and snap into the first spring finger retaining surface 78 and the second spring retaining surface 80 when aligned therewith. As such, the spring fingers 64A, 64B are configured to be easily inserted in one direction but difficult to remove in an opposite direction as outer ends of the spring fingers 64A, 64B get hooked or snapped into engagement with the retaining surfaces 78, 80. The angled portion 62 may locate the bearing retainer 28 relative to the outer jacket 22. FIG. 6 generally illustrates a perspective view of the bearing retainer 28 secured in the outer jacket 22. Each of the arm pockets 74 may be at least partially defined by projections 82 that help retain the first spring fingers 64A against the first spring retaining surfaces 78.

Figure 7:
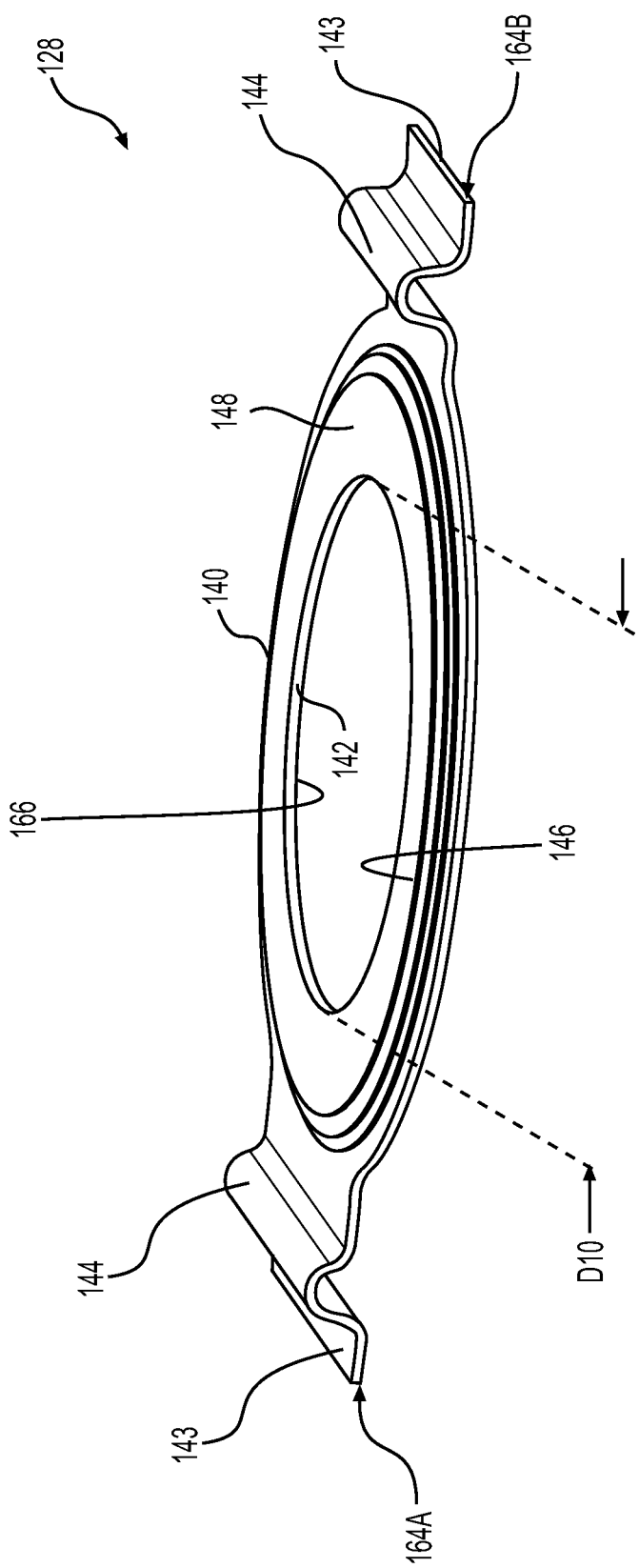
FIG. 7 generally illustrates a second embodiment of the bearing retainer according to the principles of the present disclosure.
Figure 8:
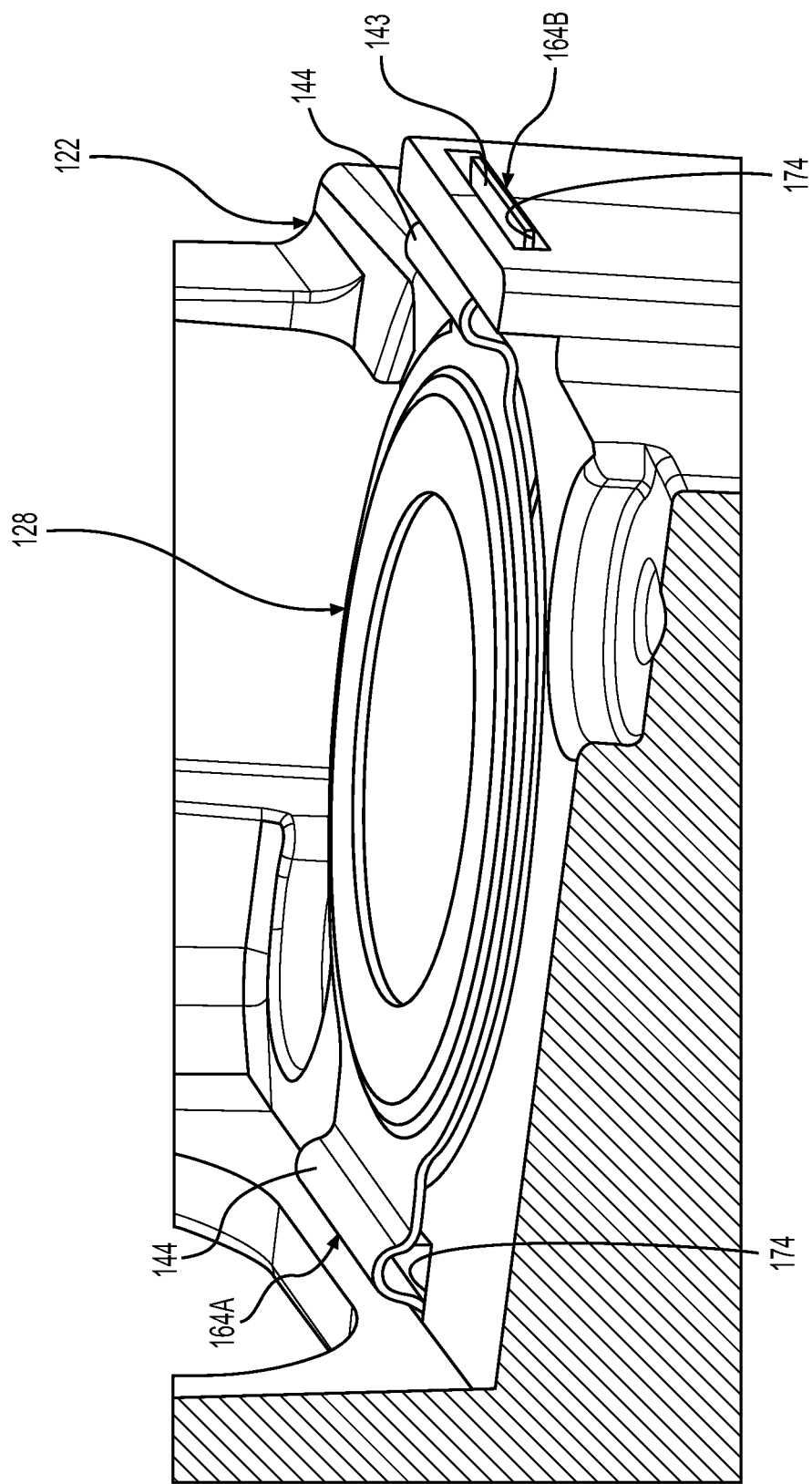
FIG. 8 generally illustrates a second embodiment of the outer jacket and the bearing retainer from FIG. 7 located therein.

FIG. 7 generally illustrates a second embodiment of the bearing retainer 128 according to the principles of the present disclosure for insertion into an outer jacket 122. Unless otherwise indicated the second embodiment of the bearing retainer 128 and the outer jacket 122 may share similar features, configurations, and assembly methods as the first embodiment presented in FIGS. 1-6. The bearing retainer 128 includes a first surface 146 opposite a second surface 166 and is defined by an outer edge 140 and an inner edge 142. The inner edge 142 defines at least a portion of a circle. In some embodiments, the inner edge 142 defines a complete circle. The circle portion of the inner edge 142 may be defined by a first diameter D10. In some embodiments, the first diameter D10 is the same size as the first diameter D1 described in relation to the first embodiment. In some embodiments, the outer edge 140 also defines at least a portion of a circle, for example, a complete circle. A pair of spring fingers 164A, 164B extend on opposite sides of the bearing retainer 128 and include a flat portion 143 being flat and a spring portion 144 bent into a bulbous shape. The first surface 146 may define a raised portion 148, which corresponds to a depressed portion on the second surface 166. FIG. 8 generally illustrates the second embodiment of the outer jacket 122 and the bearing retainer 128. The outer jacket 128 may define pockets 174 for inserting the oppositely spaced spring fingers 164A, 164B. In some embodiments, the flat portions 143 extend into the pockets 174 and are biased therein by the spring portions 148, which contact surfaces of the outer jacket 122 surrounding the pockets 174.

In some embodiments, the bearing retainer (28, 128) may be formed of a steel material, such as a spring steel material, a 1074-1075 carbon steel, or other steel alloys. In some embodiments the bearing retainer (28, 128) may have a thickness between the first surface (46, 146) and the second surface (66, 166) that is between 0.45 mm and 0.55 mm. In some embodiments, the bearing retainer (28, 128) has been heat treated, for example, via an austempering process such that at least a portion of the bearing retainer (28, 128) includes a bainite microstructure above that typically found in 1074-1075 carbon steel. In some embodiments, the bearing retainer (28, 128) is a single piece with stamped edges and elements.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A bearing retainer for a bearing assembly of a steering column, the bearing retainer comprising:
    a first surface spaced from a second surface by an outer edge and an inner edge;
    the inner edge at least partially defining an opening for placement of a provided steering shaft; and
    at least one first spring finger extending from the first surface away from the second surface at an angle,
    wherein the outer edge and the inner edge define a pair of arms and a bottom portion, wherein the pair of arms are spaced apart from one another by the bottom portion and each of the arms extend to a respective arm end,
    wherein the at least one first spring finger includes a plurality of first spring fingers with a first spring finger located on each of the arms.

2. The bearing retainer of claim 1, further comprising at least one second spring finger extending from the second surface away from the first surface at an angle.

3. The bearing retainer of claim 2, wherein the at least one second spring finger includes a plurality of second spring fingers with a second spring finger located on each of the arms.

4. The bearing retainer of claim 3, wherein the plurality of second spring fingers further includes a pair of second spring fingers located on opposite ends of the bottom portion.

5. The bearing retainer of claim 3, wherein the plurality of second spring fingers are located between the outer edge and the inner edge.

6. The bearing retainer of claim 1, wherein the plurality of first spring fingers further includes a pair of first spring fingers located on opposite ends of the bottom portion.

7. The bearing retainer of claim 1, wherein the plurality of first spring fingers are located between the outer edge and the inner edge.

8. The bearing retainer of claim 1, wherein the bottom portion includes a retaining tab opposite the pair of arms and extending away from the pair of arms.

9. The bearing retainer of claim 8, wherein the retaining tab includes an angled portion extending at a non-zero angle from the bottom portion.

10. The bearing retainer of claim 1, wherein the inner edge includes an arched portion at least partially defining the opening and the opening is at least partially circular-shaped.

11. The bearing retainer of claim 1, wherein the first surface includes a raised portion extending between the outer edge and the inner edge.

12. A bearing retainer for a bearing assembly of a steering column, the bearing retainer comprising:
    a first surface spaced from a second surface by an outer edge and an inner edge;
    the inner edge at least partially defining an opening for placement of a provided steering shaft;
    at least one first spring finger extending from the first surface away from the second surface at an angle;
    at least one second spring finger extending from the second surface away from the first surface at an angle; and
    wherein the outer edge and the inner edge define a pair of arms and a bottom portion, wherein the pair of arms are spaced apart from one another by the bottom portion and each of the arms extend to a respective arm end,
    wherein the at least one first spring finger extends from the first surface in a direction towards the bottom portion and the at least one second spring finger extends from the second surface in a direction towards the bottom portion.

13. A steering column assembly comprising:
    an outer jacket extending along an axis and defining an opening for placing a provided steering shaft and a provided bearing assembly;
    a bearing retainer for retaining the provided bearing assembly in the outer jacket, the bearing retainer comprising:
    a first surface spaced from a second surface by an outer edge and an inner edge;
    the inner edge at least partially defining an opening for placement of the provided steering shaft; and
    at least one first spring finger extending from the first surface away from the second surface at an angle,
    wherein the outer jacket defines at least one pocket for locating the at least one spring finger,
    wherein the outer edge and the inner edge of the bearing retainer define a pair of arms and a bottom portion, wherein the pair of arms are spaced apart from one another by the bottom portion and each of the arms extend to an arm end,
    wherein the at least one pocket includes a pair of arm pockets and a bottom portion pocket, the bottom portion pocket defining a pocket width extending from an outer surface of the outer jacket to an inner surface of the outer jacket, wherein the outer edge of the pair of arms defines an arm width that is less than the pocket width such that the pair of arms can be inserted through the bottom portion pocket and into the arm pockets.

14. The steering column assembly of claim 13, wherein the bearing retainer further includes at least one second spring finger extending from the second surface away from the first surface at an angle.

15. A steering column assembly comprising:
    an outer jacket extending along an axis and defining an opening for placing a provided steering shaft and a provided bearing assembly;
    a bearing retainer for retaining the provided bearing assembly in the outer jacket, the bearing retainer comprising:
    a first surface spaced from a second surface by an outer edge and an inner edge;
    the inner edge at least partially defining an opening for placement of the provided steering shaft; and
    at least one first spring finger extending from the first surface away from the second surface at an angle,
    wherein the outer jacket defines at least one pocket for locating the at least one spring finger,
    wherein the outer edge and the inner edge of the bearing retainer define a pair of arms and a bottom portion, wherein the pair of arms are spaced apart from one another by the bottom portion and each of the arms extend to an arm end, wherein the outer jacket includes a first spring retaining surface extending along the axis and at least partially defining the at least one pocket, an outer end of the at least one first spring finger in contact with the first spring retaining surface.

16. The steering column assembly of claim 15, wherein the bearing retainer further includes at least one second spring finger extending from the second surface away from the first surface at an angle.

\* \* \* \* \*